United States Patent [19]

Beraudo

[11] Patent Number: 4,625,325
[45] Date of Patent: Nov. 25, 1986

[54] X-RAY FILM PACKAGE FOR DENTAL USE

[75] Inventor: Riccardo Beraudo, Millesimo/Savona, Italy

[73] Assignee: Minnesota Mining and Manufacturing Company, St. Paul, Minn.

[21] Appl. No.: 686,193

[22] Filed: Dec. 26, 1984

[51] Int. Cl.⁴ .................................. G03B 42/02
[52] U.S. Cl. .................................. 378/168; 378/185
[58] Field of Search ............ 378/168, 169, 170, 167, 378/185

[56] References Cited

U.S. PATENT DOCUMENTS

| | | | |
|---|---|---|---|
| 2,071,110 | 2/1937 | Burke | 378/169 |
| 3,185,841 | 5/1965 | Land | 250/65 |
| 3,419,719 | 12/1968 | Goffe et al. | 250/68 |
| 3,430,042 | 2/1969 | Neri | 250/65 |
| 3,433,950 | 3/1969 | Erikson | 250/65 |
| 3,443,093 | 5/1969 | Lindenmuth et al. | 250/69 |
| 3,964,604 | 6/1976 | Prenntzell | 206/219 |
| 4,108,308 | 8/1978 | Franke | 378/169 |
| 4,534,053 | 8/1985 | Eloranta | 378/167 |

Primary Examiner—Craig E. Church
Attorney, Agent, or Firm—Donald M. Sell; James A. Smith; Mark A. Litman

[57] ABSTRACT

X-ray film package for dental use comprising a flat, flexible and light-impermeable container (12) housing an X-ray film (14) which can be exposed upon exposure of the container to the X-rays. The package comprises an intensifying screen (46) which can be introduced and taken out at full light through an opening (24) of the container and protecting means (32, 62, 64, 66, 68, 72, 74, 76, 78, 80, 82, 100) to protect the X-ray film against light penetration through the opening and auxiliary means (34) to facilitate the introduction of the intensifying screen.

28 Claims, 16 Drawing Figures

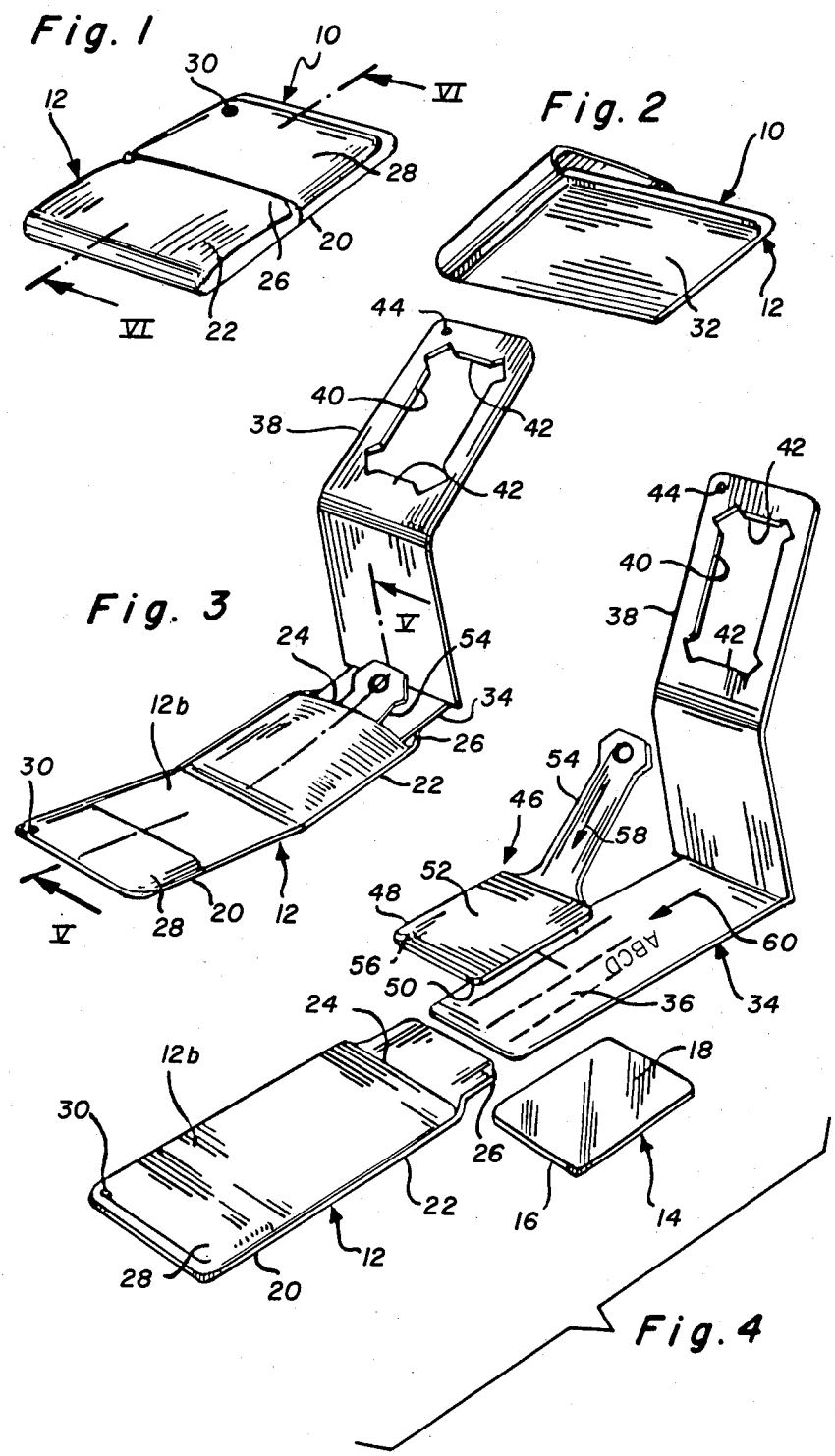

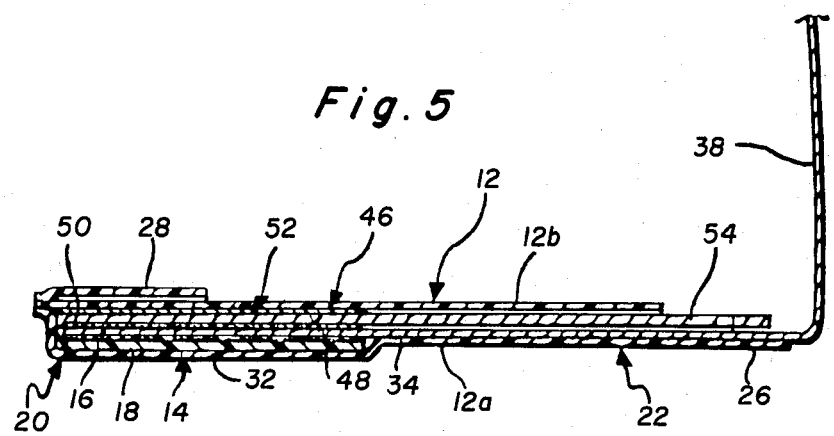
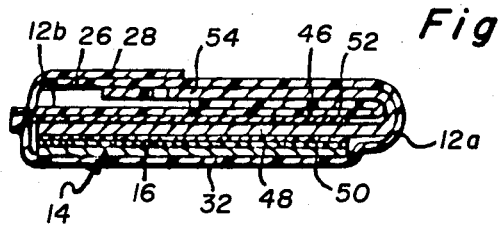
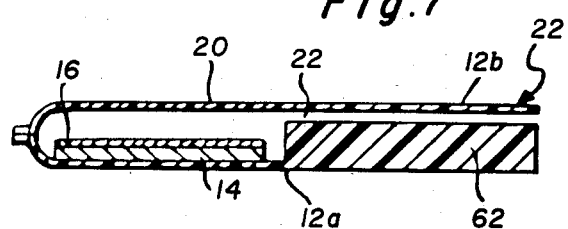
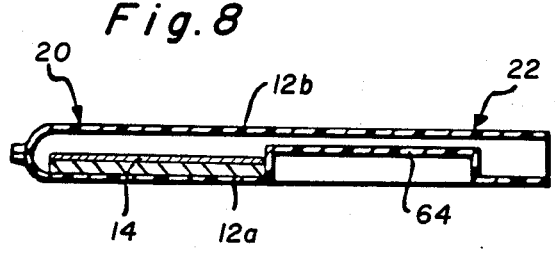
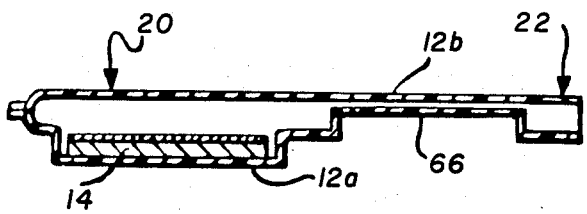

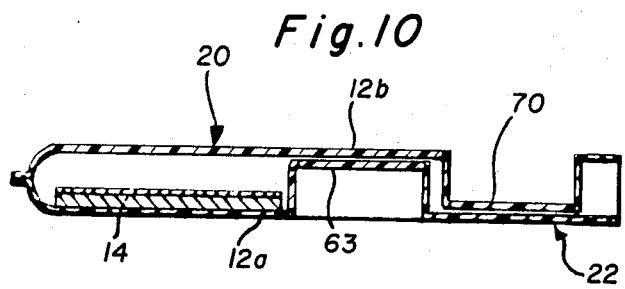
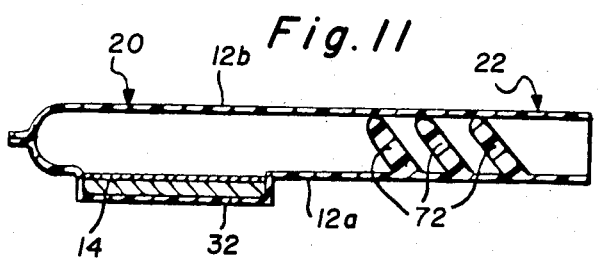
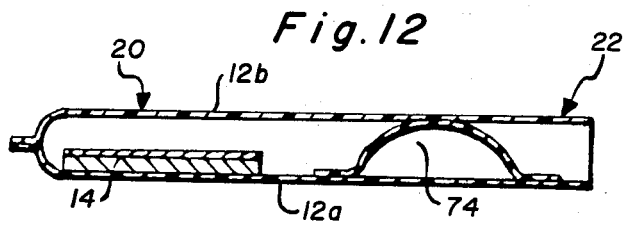
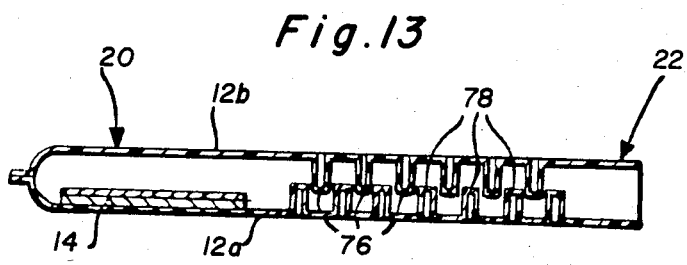
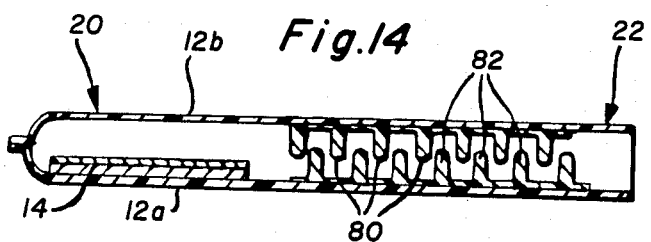

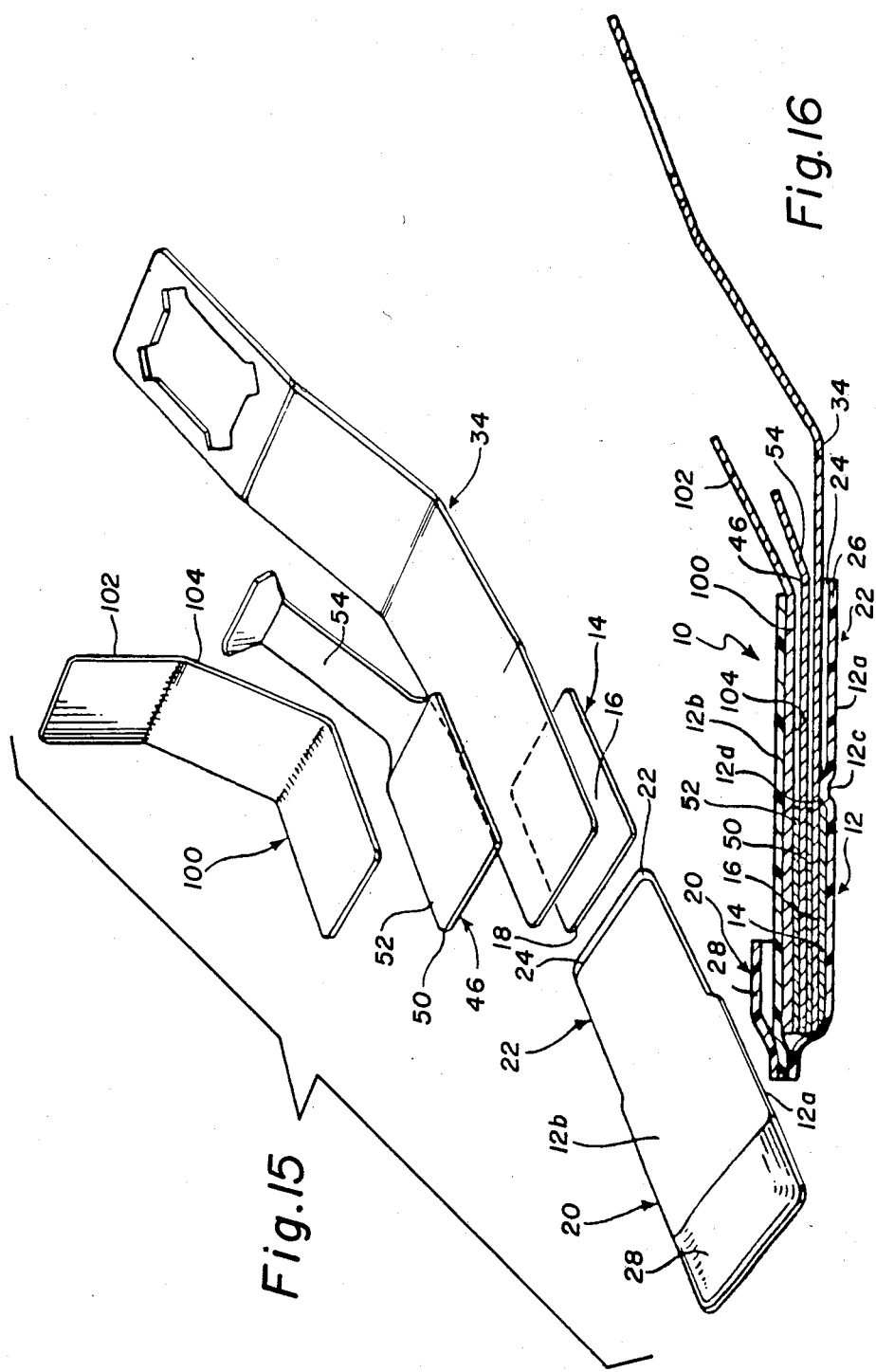

X-RAY FILM PACKAGE FOR DENTAL USE

FIELD OF THE INVENTION

The present invention generally refers to X-ray film packages for dental use of the type comprising a flexible, flat and light-impermeable container housing an X-ray film which can be exposed upon exposure of the container to a radioactive source, normally an X-ray source.

BACKGROUND OF THE ART

The packages of this type, of which an example is illustrated in U.S. Pat. No. 3,443,093, generally comprise a sealed container of plastic material, paper or the like, which has dimensions allowing an easy introduction thereof into an oral cavity against the tooth portions to be X-ray examined.

After exposure, the X-ray film, which is normally coated with sensitive emulsions on both sides, must be processed with developing and fixing solutions so as to reveal and make stable the X-ray image. To perform such operations, generally it is necessary to tear the container and remove the film in a dark room.

Alternatively, the developing and fixing processing can be carried out in full light directly inside the package, when the container is provided with sacks or tanks which can be opened upon pressure and contain the necessary solutions. Examples of packages of this type are illustrated in U.S. Pat. Nos. 3,430,042 and 3,964,604.

In all these above-mentioned package types, the X-ray film is exposed to a direct radiation. As known, this involves long exposures of the patient and of the operator to the radiations, with all the dangers deriving therefrom.

To limit this drawback, particular emulsions having higher sensitivity characteristics are more widely used, but these do not give appreciable results and even worsen the photographic results by giving rise to low definition.

In the case of packages including the developing and fixing solutions, these drawbacks further comprise a process inconstancy which causes a further image worsening.

To remove such drawbacks, it has been proposed to adopt, as in other radiographic fields, film exposing techniques using an intensifying screen associated thereto. As known, such screens are treated with fluorescent materials which can emit light upon activation due to the exposure to radiations, in particular to X-rays. The light emitted by the fluorescent material exposes the light-sensitive emulsion in an extremely more effective way than direct exposure, thus appreciably cutting down the exposure times and/or the radiation quantity necessary to obtain a good image quality.

The employment of intensifying screens in X-ray film packages for dental use is known for instance from U.S. Pat. Nos. 2,049,447; 3,185,841; 3,419,719 and 3,433,950.

In these examples the intensifying screen is an integrating part of the package and is thrown away together with the container after exposure and processing (and removal for the examination) of the X-ray film. In other words, in all proposed solutions, the intensifying screen can be used only with the package, with which it is coupled, and therefore every single film requires its own intensifying screen. This makes the package expensive due to the high cost of the screen materials.

Another drawback in all above mentioned solutions is that the intensifying screen must be applied to the package in absence of light to avoid alterations of the X-ray film characteristics and this requires complexed and delicate operations and, therefore, a further increase in the package cost.

SUMMARY OF THE INVENTION

An aspect of the present invention is that of removing the above-mentioned drawbacks and is reached by providing an X-ray film package for dental use of the above-defined type with an intensifying screen (46) which can be introduced and taken-out at full light through an opening (24) in the container (12).

With such characteristics, a relative simple and cheap package containing the X-ray film is obtained in which a reusable intensifying screen can be easily introduced prior to X-ray exposure and, as well, easily removed therefrom prior to film development.

According to the invention, the container preferably has the shape of a prolongated envelope comprising a first portion receiving the X-ray film and the above-mentioned intensifying screen, a second portion communicating at one end thereof with the first portion and being opened at the opposite end for introducing and taking out the above-mentioned intensifying screen and protecting means to protect the X-ray film against light penetration through the above-mentioned opened end.

To allow the introduction and taking-out operations, the screen is conveniently provided with an appendage working as a handle. When the screen is inside the first portion of the container, this extends therefrom to the second portion and juts out of the above-mentioned opened end of the second portion (said appendage carrying symbols to identify the correct introduction of the screen into the container).

To realize a package approximately having the same small dimensions of the traditional ones under employment conditions, the first portion of the container advantageously has substantially the same dimensions of the X-ray film and the second portion of the container can be book-wise folded up against the first portion and can be connected therewith in a releasable way.

According to the present invention, the package has been realized so as to facilitate the introduction and the correct positioning of the intensifying screen, thus removing any difficulty and risk of a wrong introduction by the user.

It is clear that such difficulties could be removed by using a double-coated X-ray film and a screen coated with fluorescent substances on both surfaces. With the film inside the container, this should anyhow assure that the film emulsion is in contact with the fluorescent coating of the screen. Such a solution, however, is not considered preferred, although within the present invention.

For reasons of simplicity and low cost, the preferred embodiment is where the X-ray film has a single side coated with sensitive emulsions, the intensifying screen has a single surface coated with fluorescent substances and the opposite surface coated with a radiation-impermeable substance, and auxiliary means are provided to assure the right positioning of the fluorescent surface of the screen against the emulsion-coated side of the X-ray film, after having introduced said screen into the container.

Such auxiliary means advantageously consist of an introduction strip, releasably placed inside the container and in contact with the emulsion-coated side of the X-ray film, carrying symbols which show the surface thereof on which the screen is to be placed (which, in its turn, carries symbols which, together with said symbols of the strip, show the right positioning thereof).

In such a way, it is possible to determine the introduction positioning of the intensifying screen into the container, which must be placed with its fluorescent surface in contact with the indicated surface of the introduction strip. Once that the screen has been introduced, the introduction strip is removed from the container and the fluorescent surface of the screen results in contact with the emulsion-coated side of the film.

This solution results to be advantageous also in that the radiation-impermeable surface of the intensifying screen is an effective protection against the diffusion of radiations spreading out during the package exposure to X-rays.

The introduction strip is advantageously provided with an appendage jutting out of the opened end of the container and with a frame-shape portion provided with elements which hold the X-ray film after development.

This facilitates the examination of the X-ray image, as well as places on file the X-ray image in a practical and functional way.

BRIEF DESCRIPTION OF THE DRAWINGS

Further characteristics and advantages of the present invention will result more evident from the following detailed description, made with reference to the drawings merely enclosed for example purposes which do not limit the present invention, wherein:

FIG. 1 is a perspective view of an x-ray film package for dental use according to the present invention, shown in its folded employment condition;

FIG. 2 is a perspective view from the bottom of FIG. 1;

FIG. 3 is a perspective view of the package shown in its unfolded condition prior to employment;

FIG. 4 is a perspective exploded view of FIG. 3;

FIG. 5 is a view in longitudinal section and in a larger scale according to line V—V of FIG. 3;

FIG. 6 is a section view and in a larger scale according to line VI—VI of FIG. 1;

FIGS. 7 to 14 schematically show eight variants of FIG. 5, in which some parts have been left out for reasons of simplicity;

FIG. 15 is a perspective exploded view of another x-ray film package for dental use according to the present invention; and FIG. 16 is a view in longitudinal section and in a larger scale of an x-ray film package for dental use corresponding to that of FIG. 15 shown in its unfolded condition prior to use.

DETAILED DESCRIPTION OF THE INVENTION

Referring initially to FIGS. from 1 to 6, 10 shows an X-ray film package for dental use, as a whole, according to the present invention.

Package 10 essentially comprises a flat flexible container 12 wherein an X-ray film 14 has been placed according to modalities described hereinafter.

X-ray film 14 consists of a single-side coated film of the conventional type, i.e. having a sensitive emulsion coated on one side 16 thereof and the antihalo layer coated on the opposite side 18. The dimensions of film 14 are the conventional ones for dental use, for instance 2×3, 3×4 or 4×5 cm.

The film can be for example of the type produced and put on the market by the Applicant under the name 3M CRT 7.

Container 12 has the general form of a rectangular prolongated envelope having a width substantially corresponding to that of film 14 and a length substantially twice the length of such film. Envelope 12 is preferably realized by employing two coupled sheets, respectively a frontal one 12a and a dorsal one 12b made of a liquid-tight and light-tight plastic material, preferably polyethylene, or of resin-coated paper for foods. The external surfaces of the two sheets 12a and 12b preferably are different in colors, for instance water-green and black, while the internal surfaces thereof are respectively black in color and radiation-impermeable in order to avoid light reflections for reasons which will be explained hereinafter.

Envelope 12 is ideally divided into two portions respectively shown under 20 and 22, the former (20) of which receives the X-ray film and the latter (22) communicates with one end thereof with the former and is opened in correspondence with its opposite end 24. Opening region 24 contains a lower-width tongue 26 jutting out therefrom and being obtained in frontal sheet 12a, while a pocket 28 is applied to dorsal sheet 12b in correspondence with the closed end of envelope 12. The external surface of pocket 28 may advantageously contain writings in different languages (not shown) for a prompt identification of the dorsal surface of container 12. Furthermore, the same external surface of pocket 28 advantageously carries on a side thereof a reference mark 30 consisting of a colored stamp the function of which will be explained hereinafter.

Portion 20 of envelope 12, i.e. that receiving X-ray film 14, in the example illustrated in FIGS. from 1 to 5, is provided with an internal depression consisting of an external relief 32 obtained in frontal sheet 12a and defining the housing place of X-ray film 14. As further explained hereinafter, the function of said depression is that of screening and protecting X-ray film 14 from possible light penetration into container 12 through opening 24.

As clearly shown in FIG. 5, X-ray film 14 is placed within portion 20 of container 12 with the emulsion-coated side 16 thereof turned towards the inside of said container, i.e. towards the part opposite to relief 32. In the condition illustrated in FIGS. 3 and 5, the emulsion-coated side 16 is placed against the rectangular introduction strip 34, normally made of cardboard or the like, placed within the cavity of container 12 such that it can be removed. Strip 34 is planned in 36 for writing the identification data of the X-ray image to be obtained on film 14 and is provided with an appendage 38 jutting outwards from the envelope in which an opening 40 is made, defined by holding parts 42, to receive film 14 after development. To the purpose of facilitating the positioning of the film into frame 40, appendage 38 carries a reference 44 similar to reference 30 to identify the orientation under which the X-ray exposure has been made.

Under 46 an intensifying screen is shown which consists of a flexible plastic material support 48, normally of polyester, having a rectangular shape corresponding to that of film 14 and a surface 50 made fluorescent by a rare earth phosphor layer coated thereon.

The other surface of support 48 is coated with a radiation-impermeable protection layer, conveniently consisting of a lead laminar sheet having a thickness of about 3-4 hundredths of millimeter.

Support 48 is provided with a narrow and long appendage 54, integral therewith, which can be used as a handle as explained with more details hereinafter. Such appendage 54 can be folded towards the radiation-impermeable coating 52 along its line of junction with support 48.

The fluorescent surface 50 carries on one side thereof a reference 56, similar to references 30 and 44, which can be used in combination therewith to identify, after having exposed film 14, the position in which the X-ray exposure has been performed.

After having described the components of package 10, it should be hereinbelow explained how such components can be used and how co-operate together while employing the package itself.

In a first step prior to employment the intensifying screen is introduced into the package; in a second step prior to employment the introduction strip is pulled out and in a third and last step prior to exposure the second portion of the envelope is folded onto the first one. Package 10 is formed by container 12 into which the X-ray film 14 and the introduction strip 34 are introduced according to the illustration in FIGS. 3 and 5, while the intensifying screen 46 has not yet been introduced. By means of handle 54, the intensifying screen is then introduced manually by introducing support 48 into the opening 24 between the dorsal sheet 12b and the introduction strip 34, with its fluorescent surface 50 turned towards such strip 34. Support 48 is then pushed by means of handle 54 to portion 20 of container 12 housing X-ray film 14. Note that to avoid any possible mistake, handle 54 and strip 34 are both provided with respective marks 58, 60 which, together with references 30 and 48 or other marks or instructions not shown in the figures, guide the introduction of intensifying screen 46 in a correct way for X-ray exposure.

At this point, package 12 effectively takes the shape illustrated in FIGS. 3 and 5, with support 48 adjacent to dorsal sheet 12b, the X-ray film adjacent frontal sheet 12a of container 12, introduction strip 34 placed between fluorescent surface 50 of support 48 and sensitive emulsion 16 of film 14, reference 56 placed in correspondence with reference 30 and handle 54 passing through portion 22 of container 12 and jutting out at its free end through opening 24.

The second step consists of pulling out the introduction strip 34 from container 12 by pulling appendage 38. In this way, support 48 of screen 46 and X-ray film 14 result in direct contact one with the other, with fluorescent surface 50 against emulsion 16.

The last step more precisely consists of folding up the package so as to obtain the shape illustrated in FIGS. 1, 2 and 6. This is merely obtained by book-wise folding up portion 22 of container 12 and together handle 54 of screen 46 against portion 20 and introducing tongue 26 into pocket 28. In this way, package 10 takes the dimensions corresponding to those of the conventional packages and can be easily introduced into the oral cavity of the patient in correspondence with the dental region to be X-ray examined, with the frontal surface of portion 20 (i.e. relief 32) turned towards the X-ray source.

During the exposure step, the X-ray radiations emitted by the source strike the fluorescent surface 50 of screen 46 and are converted into light rays which are reflected onto the emulsion 16 of film 14, thus exposing it. This allows a drastic reduction in radiation exposure time, that is the X-ray quantity, yet assures a high definition and therefore a high quality X-ray image to be obtained at the same time (according to the film type used).

It is worthwhile noticing that at the end of exposure reference 56 of screen 46 is also exposed on film 14 and this can be advantageously used to identify the position in which X-ray exposure has been made.

At the end of the exposure step, package 10 is removed from the oral cavity of the patient and again re-adapted according to the shape illustrated in FIGS. 3 and 5 by releasing tongue 26 from pocket 28, this to allow the intensifying screen 46 to be removed from container 12 and to be used again.

At this point, nothing else must be done but process film 14, and this operation can be performed according to conventional techniques, after having removed film 14 in a dark room from container 12.

Alternatively, package 10 allows film 14 to be processed in full light by directly introducing, through orifice (24), the developing and fixing solutions into container 12 with the aid of special authomatic equipments.

Introduction strip 34 can be advantageously used, at the end of the processing operations, to keep and file the obtained X-ray image. To this purpose, the exposed X-ray film can be placed into frame 40 and held by means of holding parts 42, this rendering the examination thereof easier. The reference which can be found on film 14 in this case should be turned towards reference 44 applied to appendage 38 of strip 34 such as to assure the orientation of film 14 according to the position in which the X-ray exposure has been made.

To identify and file the X-ray image it is sufficient to write the pertinent data on region 36 of strip 34.

Due to the particular shape of package 10 according to the present invention the operations of introducing screen 46 and of taking out the introduction strip 34 prior to exposure, as well as the following operation of taking out screen 46 after exposure can be all performed in full light, with obvious advantages of convenience and practicity, without any possibility of altering the characteristics of the light sensitive emulsion 16 of film 14.

Such emulsion 16 is in fact effectively protected against possible light penetrations through opening 24 due both to the fact that it is placed in the lower portion formed by relief 32 and is therefore well-protected by introduction strip 34 or support 48 of screen 46 and to the fact that the internal black-opaque walls of container 12 prevent light reflections.

FIGS. from 7 to 14 show different variants which refer to various possibilities of the present invention to obtain more effective protective effects to X-ray film 14 during handling package 10.

In the case of FIG. 7, relief 32 has been replaced with a thickening 62 obtained on the internal surface of frontal sheet 12a in correspondence with portion 22 of container 12.

In the case of FIG. 8, relief 32 has been replaced with a lower portion 64 of frontal sheet 12a turned towards the inside of container 12 in correspondence with portion 22 thereof.

FIG. 9 shows both relief 32 in correspondence with portion 20 and a lower portion 66 similar to 64 of FIG. 8 but having a step-wise shape.

In the case of FIG. 10, relief 32 has been replaced with two adjacent depressions 68, 70 in correspondence with portion 22 of container 12 respectively obtained in frontal sheet 12a and in dorsal sheet 12b and turned towards the inside of container 12, so as to obtain a labirynth configuration.

In the embodiment shown in FIG. 11, relief 32 further contains a series of inclined and flexible tongues 72 jutting into the cavity of container 12, in correspindance with portion 22 thereof, from the internal surface of frontal sheet 12a. Such reliefs 72 could alternatively jut out from the internal surface of dorsal sheet 12b or still alternatively from both sheets 12a and 12b.

In the example of FIG. 12, relief 32 has been replaced with a deformable relief or tongue 74 in the cavity of container 12 in correspondence with portion 22 thereof.

In the case of FIG. 13, relief 74 of FIG. 12 has been replaced with a series of alternated depressions 76, 78 jutting into the cavity of container 12 in correspondance with portion 22 thereof and respectively obtained on the dorsal surface 12b and on the frontal surface 12a.

In the case of FIG. 14, depressions 76 and 78 have been replaced with deformable alternated reliefs or teeth 80, 82 jutting into the cavity of container 12 in correspondence with portion 22 thereof respectively from frontal sheet 12a and dorsal sheet 12b.

FIGS. 15 and 16 show another possibility of the present invention to obtain more effective protective effects to x-ray film 14 during handling package 10.

In the embodiment shown in said FIGS. 15 and 16, the connection region between portions 20 and 22 of the envelop 12 on the frontal sheet 12a is provided with a cross-mark 12c defining a folding line, the function of which will appear evident hereinafter. Such a mark forms a relief 12d jutting out from the frontal sheet 12a and delimiting the housing of film 14. The function of such relief is that of protecting additionally the x-ray film 14 from possible light penetration into the container 12 through opening 24. It is worhtwhile noticing however that, on the grounds of the experiments described hereinafter, relief 12d is optional and may be abolished. The protection of film 14 from possible light penetration into the container 12 through opening 24 is obtained according to the invention mainly by including into the package a protecting strip 100 introduced in a releasable way into container 12 through opening 24, between the intensifying screen 46 and sheet 12b of container 12. Such strip 100 normally is made of paper or similar material and has a width like that of the x-ray film 14 and a length higher than that of container 12, such as to form an appendix 102 jutting outside the opening 24. Appendix 102 can be folded against the external surface of sheet 12b of such container 12.

The surface of the protecting strip 100 turning towards the x-ray flm 14 has an opaque coloration such as to absorb room-light, preferably a black apaque coloration.

After having described the components of the package 10 including the protecting strip 100, it should be hereinbelow explained how such components can be used and how they cooperate together while employing the package itself.

In a first step before use, the intensifying screen 46 is introduced into the package comprising the x-ray film 14, the insertion strip 34 and the protecting strip 100; in a second step before use, the insertion strip 34 is pulled out and in the third and last step, before exposure, portion 22 is folded on portion 20 of the envelope 12 and tongue 26 is introduced into pocket 28. In this way, the package is ready to be introduced into the patient's mouth, in correspondence with the dental region to be radiographed, with the frontal side of portion 20 turned towards the x-ray emitting source.

During the exposure step, the x-rays emitted by the source strike the fluorescent surface 50 of the screen 46 and are converted into light rays which are reflected onto emulsion 16 of film 14, thus exposing it.

At the end of the exposure step, package 10 is removed from the patient's mouth and the envelope 12 is re-extended, as shown in FIG. 1, to take out the intensifying screen 46 and allow a further use thereof. In this step, the protecting strip 100 effectively protects the x-ray film 14 against possible light penetration through the opening 24 of the envelope 12.

At this point, nothing is left but to proceed with the processing of the film 14, which can be performed according to the conventional techniques, after having taken out the film 14 from the container 12 in dark room, or by directly introducing developing and fixing solutions into the container 12, after having removed the protecting strip 100.

It is clear of course that other possible embodiments may be realized and be different from those hereinbefore described or may consist of different combinations thereof. As an example, sheets 12a and 12b could merely have two transverse depression lines turned towards the inside of container 12 near the ideal separation line between portions 20 and 22.

Such expedients may not be necessary, since the length of container 12 and the black-opaque coloration of the internal walls thereof, together with introduction strip 34 and intensifying screen 46, could be alone sufficient to assure the necessary protection to the emulsion-coated side 16 of X-ray film 14. It is therefore possible within the present invention to have a simplified version of container 12, wherein relief 32, all other different shapes described above of frontal and dorsal sheets 12a and 12b, or the protecting strip 100 have been left out.

It is clear from the above description that, with respect to the conventional type packages, package 10 according to the present invention has a series of important advantages, which can be summarized as follows.

Reduction of the radiation exposure times, i.e. reduction of the X-ray quantity and, consequently, lower risks of tumour effects to the patient (the exposure region of the dental X-ray film is near the thyroid) and for the operator.

Lower wear and therefore higher endurance of the X-ray tubes.

Possibility of using exposure techniques which affect both patient protection and image quality.

Better definition and therefore higher quality of the X-ray image. And in the case of processings in automatic processors:

possibility of processing the film in full light;

possibility of varying the coupling according to the operator's needs;

better consistency of film processing;

possibility of varying the film contrast with the processing;

cutting-down of the times required to obtain the X-ray results due to the possibility of using full-light processing systems. The total processing time can be cut down from the normal 3-5 minutes to 40-50 seconds.

Low manufacturing cost.

Notwithstanding the principle of the present invention, the manufacturing particulars and the embodiments can be of course be widely changed with respect to what described and illustrated hereinbefore, without however falling out the present invention as it is defined in the following claims.

What is claimed is:

1. X-ray film package for dental use comprising a flexible, flat and light-impermeable, x-ray penetrable container (12) housing an X-ray film (14) and an intensifying screen (46), characterized in that said container (12) is provided with an orifice (24) that can receive said intensifying screen (46), said package characterized in that the container (12) has the shape of a prolongated envelope having a first portion (20) receiving the X-ray film (14) and the above mentioned intensifying screen (46), and a second portion (22) communicating at one end thereof with the first portion (20) and being opened at the opposite end (24) for introducing and taking out the said intensifying screen (46), the container (12) being provided with protecting means (32, 62, 64, 66, 68, 72, 74, 76, 78, 80, 82, 100) to protect the X-ray film (14) against light penetration through said opened end (24).

2. The package according to claim 1, characterized in that the intensifying screen (46) consists of a flexible plate (48) having dimensions substantially corresponding to those of the X-ray film (14) and having at least one surface thereof (50) coated with fluorescent substances, said plate (48) carrying an appendage working as a handle (54) which extends through the second portion (22) of the container and juts out of the above-mentioned opened end (24), when the intensifying screen (46) is inside the first portion (20) of the container (12).

3. The package according to claim 2, characterized in that the X-ray film (14) has a single side thereof (16) coated with sensitive emulsion, the intensifying screen (46) has a single surface thereof (50) coated with a fluorescent substance and in that the package (10) further comprises auxiliary means (34) to assure the correct positioning of the intensifying screen (46) with the fluorescent surface thereof (50) against the sensitive side (16) of the X-ray film (14) after the introduction of said intensifying screen (46) into the container (12).

4. The package according to claim 3, characterized in that said auxiliary means consist of an introduction strip (34) which is introduced into and can be taken out of the wrapper (12) and is placed as to face the above-mentioned sensitive side (16) of the X-ray film (14).

5. The package according to claim 4, characterized in that the introduction strip is provided with an appendage (38) which juts out of the opened end (24) of the container (12) and has a frame portion (40) provided with elements (42) holding the X-ray film (14) after its development, when said introduction strip (34) is inside the wrapper (12).

6. The package according to claim 5, characterized in that the container (12) and the fluorescent surface (50) of the intensifying screen (46) are respectively provided with references (30, 56) for the identification of the exposure position of the X-ray film (14).

7. The package according to claim 6, characterized in that the introduction strip (34) comprises a reference (44) corresponding to the references of said container and fluorescent surface (30, 56).

8. The package according to claim 4, characterized in that the introduction strip (34) is provided with places (36) to write data for the identification of the X-ray image.

9. The package according to claim 4, characterized in that the introduction strip (34) and the intensifying screen (46) have corresponding marks (58, 60) suitable to facilitate the introduction of the intensifying screen (46) into the container (12).

10. The package according to claim 3, characterized in that the intensifying screen (46) on the surface opposite to the fluorescent one (50) is provided with a protective coating of a radiation-impermeable material (52).

11. The package according to claim 3, characterized in that the fluorescent surface (50) of the intensifying screen (46) consists of a rare earth phosphor layer.

12. The package according to claim 11, characterized in that the intensifying screen (46) comprises a support of polyester resin.

13. The package according to claim 1, characterized in that the first portion (20) of the container (12) has dimensions substantially corresponding to those of the X-ray film (14) and the second portion (22) of the container (12) can be book-wise folded up against the first portion (20) and can be connected therewith in a releasable way.

14. The package according to claim 3, characterized in that a handle appendage (54) is attached to said intensifying screen and said handle appendage (54) can be folded up.

15. The package according to claim 3, characterized in that the container (12) consists of two coupled sheets, respectively a frontal one (12a) and a dorsal one (12b) made of a liquid-tight plastic material.

16. The package according to claim 15, characterized in that the above-mentioned protecting means comprise an external relief (32) obtained in the frontal sheet (12a) in correspondence with the above-mentioned first portion (20) of the container (12) and defining a receiving place for the X-ray film (14) depressed with respect to the general plane of said frontal sheet (12a).

17. The package according to claim 15, characterized in that the above-mentioned frontal (12a) and dorsal (12b) sheets of the container (12) have internal surfaces with a black-opaque coloration.

18. The package according to claim 16, characterized in that the frontal sheet (12a) of the container (12) forms a tongue (26) in correspondence with the opened end (24) of said container (12), and the dorsal sheet (12b) near the opposite end of the container (12) has a pocket (28) to receive said tongue (26) when the container (12) is folded up.

19. The package according to claim 15, characterized in that the above-mentioned protecting means comprise an internal relief (62, 74) with which said frontal sheet (12a) is provided in correspondence with the above-mentioned second portion (22) of the container (12).

20. The package according to claim 19, characterized in that the above-mentioned internal relief (66) has a step-wise shape.

21. The package according to claim 15, characterized in that the above-mentioned protecting means comprise an external rise (32) obtained in the frontal sheet (12a) in correspondence with the first portion (20) of the container (12) and defining a receiving place for the X-ray film (14) depressed towards the outside with respect to the general plane of said frontal sheet (12a), as well as an internal relief (66) with which said frontal sheet (12a) is provided in correspondence with the second portion (22) of the container (12).

22. The package according to claim 21, characterized in that the above-mentioned relief consists of a thickening (62) of the frontal sheet (12a).

23. The package according to claim 15, characterized in that the above-mentioned protecting means comprise two internal adjacent reliefs (68, 70) respectively formed by the depressions of the frontal sheet (12a) and dorsal sheet (12b) in correspondence with the above-mentioned second portion (22) of the container (12).

24. The package according to claim 8, characterized in that the above-mentioned protecting means comprise a plurality of elastic inclined internal tongues (72) jutting out of one of said frontal or dorsal sheets (12a) towards the other sheet.

25. The package according to claim 15, characterized in that the above-mentioned protecting means comprise a series of alternated reliefs (76, 78, 80, 82) made in said frontal and dorsal sheets (12a, 12b) in correspondence with the above-mentioned second portion (22) of the container (12).

26. The package according to claim 25, characterized in that said internal reliefs are made of springing small teeth (80, 82).

27. The package according to claim 15, characterized in that the above mentioned protecting means comprise a strip (100) introduced in a releasable way into the container (12) and having a room-light absorbing opaque surface (104) turned towards the x-ray film (14) and suitable to be placed in a faced position with respect to said film whenever the above mentioned intensifying screen (46) is removed from the container (12) after the exposure of the package to the x-rays.

28. The package of claim 27, characterized in that said protecting strip (100) is provided with a portion (102) jutting out of said opened end (24) of the container (12).

* * * * *